(12) United States Patent
Yabuki

(10) Patent No.: US 10,192,508 B2
(45) Date of Patent: Jan. 29, 2019

(54) DISPLAY APPARATUS AND THREE-DIMENSIONAL IMAGE DISPLAY SYSTEM

(71) Applicant: Sakai Display Products Corporation, Sakai-shi, Osaka (JP)

(72) Inventor: Haruhito Yabuki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/118,006

(22) PCT Filed: Mar. 19, 2014

(86) PCT No.: PCT/JP2014/057502
§ 371 (c)(1),
(2) Date: Aug. 10, 2016

(87) PCT Pub. No.: WO2015/140956
PCT Pub. Date: Sep. 24, 2015

(65) Prior Publication Data
US 2017/0011701 A1  Jan. 12, 2017

(51) Int. Cl.
*G06F 3/038* (2013.01)
*G09G 3/36* (2006.01)
(Continued)

(52) U.S. Cl.
CPC ........... *G09G 3/3688* (2013.01); *G09G 3/003* (2013.01); *G09G 3/004* (2013.01); *G09G 3/3611* (2013.01);
(Continued)

(58) Field of Classification Search
CPC ...... G09G 3/3688; G09G 3/003; G09G 3/004; G09G 3/3611; G09G 3/3677;
(Continued)

(56) References Cited

U.S. PATENT DOCUMENTS 4,570,233 A * 2/1986 Yan .................. G06T 15/40
345/426
6,449,003 B1 * 9/2002 Mayer ................ H04N 13/0029
348/43
(Continued)

FOREIGN PATENT DOCUMENTS

JP    H08-304774 A    11/1996
JP    2012-108509 A   6/2012
WO    WO2011126090 A1 10/2011

*Primary Examiner* — Jinsong Hu
*Assistant Examiner* — Alexander J Yi
(74) *Attorney, Agent, or Firm* — Rudy J. Ng; Bret E. Field; Bozicevic, Field & Francis LLP

(57) ABSTRACT

Provided is a display apparatus which generates an image signal having a scanning frequency twice as high as an input image signal without increasing the processing load on a signal driving unit and displays the image signal on a display panel. The display apparatus includes a timing controller for extracting a vertical synchronizing signal and a horizontal synchronizing signal from an input image signal, a display panel having a plurality of scan lines and a plurality of signal lines perpendicularly crossing the scan lines, a scan driving unit for sequentially applying a scanning voltage to each of the scan lines based on the extracted vertical synchronizing signal and horizontal synchronizing signal, and a signal driving unit for applying a signal voltage to each of the signal lines.

4 Claims, 5 Drawing Sheets

(51) Int. Cl.
*H04N 13/139* (2018.01)
*H04N 13/341* (2018.01)
*H04N 13/398* (2018.01)
*G09G 3/00* (2006.01)

(52) U.S. Cl.
CPC ......... *G09G 3/3677* (2013.01); *H04N 13/139* (2018.05); *H04N 13/341* (2018.05); *H04N 13/398* (2018.05); *G09G 2300/0426* (2013.01); *G09G 2310/0213* (2013.01); *G09G 2310/08* (2013.01); *G09G 2320/0209* (2013.01); *G09G 2340/0435* (2013.01)

(58) Field of Classification Search
CPC .. G09G 3/3413; G09G 3/3406; G09G 3/3607; G09G 2300/0426; G09G 2310/0213; G09G 5/10; G09G 3/36; G09G 2320/0209; G09G 2310/08; G09G 2340/0435
See application file for complete search history.

(56) References Cited

U.S. PATENT DOCUMENTS

| | | | |
|---|---|---|---|
| 6,697,041 B1 * | 2/2004 | Tamai | G09G 3/3688 345/100 |
| 2007/0195408 A1 * | 8/2007 | Divelbiss | G02B 26/008 359/462 |
| 2011/0018983 A1 * | 1/2011 | Kim | G02B 27/2264 348/56 |
| 2012/0105606 A1 * | 5/2012 | Kim | G09G 3/342 348/51 |
| 2012/0120050 A1 * | 5/2012 | Hemminki | H04N 13/0055 345/419 |
| 2012/0120128 A1 | 5/2012 | Oh et al. | |
| 2013/0027525 A1 | 1/2013 | Kitayama et al. | |
| 2013/0249971 A1 * | 9/2013 | Lee | G09G 3/3413 345/691 |
| 2014/0333688 A1 * | 11/2014 | Hung | G09G 3/3611 345/698 |

* cited by examiner

F I G. 1
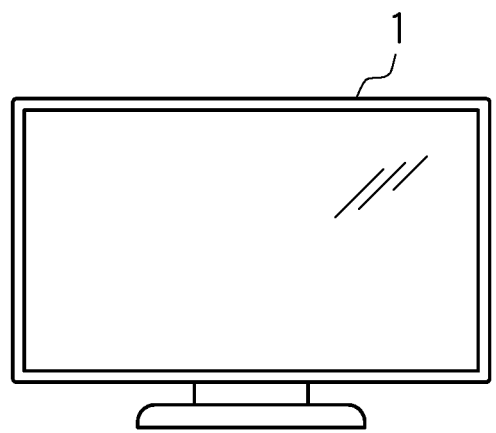
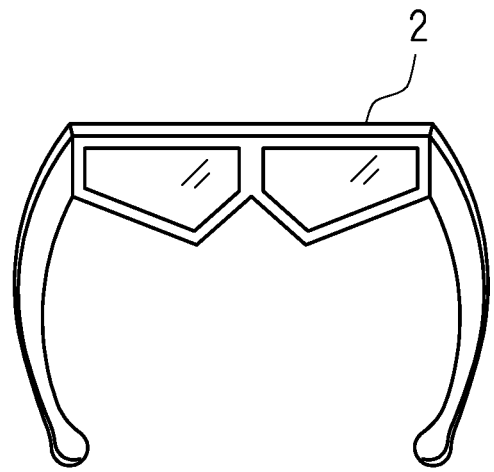

F I G. 2
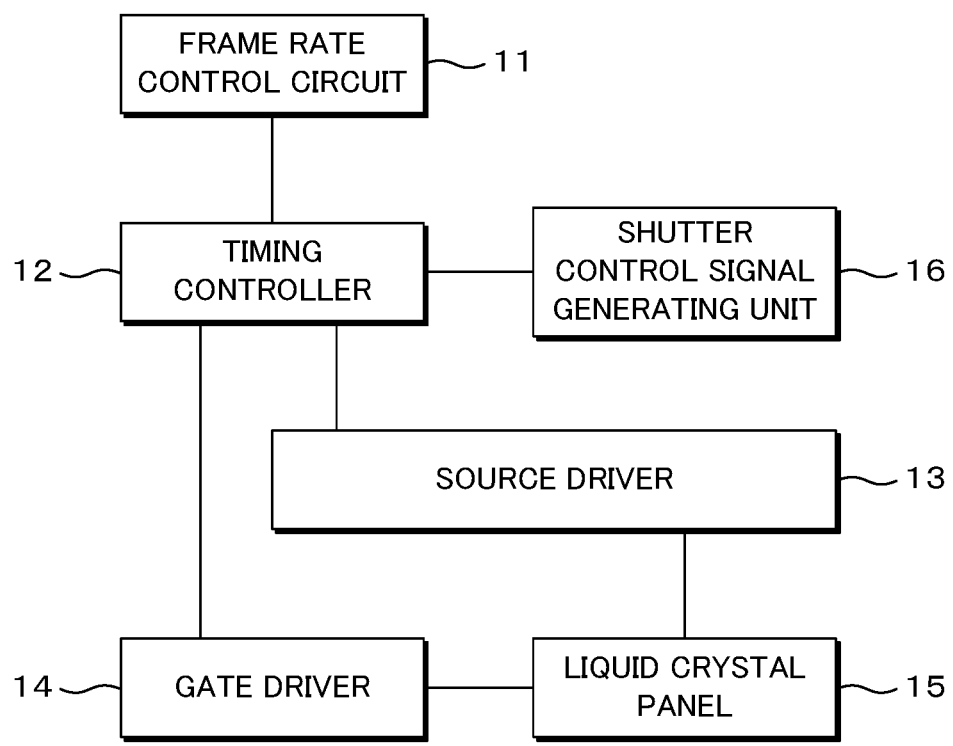

DISPLAY APPARATUS AND THREE-DIMENSIONAL IMAGE DISPLAY SYSTEM

CROSS-REFERENCE TO RELATED APPLICATIONS

This application is the national phase under 35 U.S.C. § 371 of PCT International Application No. PCT/JP2014/057502 which has an International filing date of Mar. 19, 2014 and designated the United States of America.

FIELD

The present invention relates to a display apparatus or the like having a three-dimensional display function to display three-dimensional video images.

BACKGROUND

In recent years, the development of liquid crystal displays (LCD) having a three-dimensional display function to display three-dimensional video images (WO 2011/126090) has been advancing. The three-dimensional display function employs an active shutter system using liquid crystal shutter glasses (hereinafter, referred to as glasses), for example. In the active shutter system, a right-eye video image and a left-eye video image are alternately displayed on a liquid crystal display by time-sharing. The left-eye view is blocked by the glasses while the right-eye video is being displayed, and the right-eye view is blocked by the glasses while the left-eye video is being displayed. By repeating such processes of displaying video and blocking the view by the glasses, the right eye and left eye of the user can perceive the different video. This difference between the right-eye video and the left-eye video (parallax) enables the user to feel stereoscopic effect of the displayed video images. As for the liquid crystal displays employing the active shutter system, in order to improve display performance, it is important to reduce the occurrence of a phenomenon in which the right-eye video comes into the left-eye view, or the left-eye video comes into the right-eye view (so-called crosstalk).

Meanwhile, the liquid crystal displays have become larger in size and higher in resolution. In recent years, so-called 4K2K liquid crystal displays having approximately 8.29 million pixels, 3840-by 2160-pixel resolutions, have been on the market. Some 4K2K liquid crystal displays employ a frame rate of 120 Hz and a double source structure.

The double source structure is a technology that enables simultaneous charging of two lines of pixels by providing two source lines to thereby extend the time used for charging.

SUMMARY

The 4K2K liquid crystal displays as described above are also desired to be equipped with a three-dimensional display function. In the case where the displays are equipped with the three-dimensional display function, it is effective for improvement in crosstalk to halve the vertical resolution and have a scanning frequency of 240 Hz. However, this requires a timing controller or a signal driving unit (source driver) to have high processing power, resulting in great increase in cost.

The present invention is made in view of the above-described problems, and the object is to provide a display apparatus that generates an image signal having a scanning frequency twice as high as that of an input image signal without increasing the processing load on a signal driving unit, and displays the image signal on a display panel.

A display apparatus according to one embodiment of the present invention comprises a timing controller extracting a vertical synchronizing signal and a horizontal synchronizing signal from an input image signal; a display panel provide with a plurality of scan lines and a plurality of signal lines perpendicularly crossing the plurality of scan lines, and performing display, in a case where a scanning voltage is applied to a scan line, in accordance with a signal voltage applied to a signal line based on an image signal; a scan driving unit sequentially applying a scanning voltage to each of the scan lines in accordance with the extracted vertical synchronizing signal and horizontal synchronizing signal; and a signal driving unit applying a signal voltage to each of the signal lines in accordance with the image signal, wherein the signal driving unit includes a converting unit for converting the input image signal into an image signal corresponding to a display panel having twice as many scan lines, and applies a signal voltage to the signal line in accordance with the image signal converted by the converting unit.

According to the embodiment of the present invention, a converting unit for converting the input image signal into an image signal corresponding to a display panel having twice as many scan lines is included in a signal driving unit (source driver). This makes it possible to perform image conversion without increasing the processing load on a timing controller and a scan driving unit (gate driver).

In the display apparatus according to the embodiment of the present invention, it is preferable that the converting unit has a data latch for latching an input image signal and a line memory for storing an image signal, and duplicates pixel data by, every time one pixel of data is latched by the data latch, simultaneously storing the one pixel of data in areas of two pixels of the line memory, and the signal driving unit applies a signal voltage to the signal line in accordance with the image signal stored in the line memory.

According to the preferable embodiment of the present invention, pixel data is duplicated by simultaneously storing one pixel of data in areas of two pixels of the line memory. This makes it possible to minimize the processing load caused by the image conversion.

In the display apparatus according to the embodiment of the present application, it is preferable that the image signal includes an image signal related to a right-eye-image and an image signal related to a left-eye-image for three-dimensional display, and the timing controller generates a vertical synchronizing signal and a horizontal synchronizing signal such that a right-eye image and a left-eye image are alternately displayed on the display panel.

According to the preferable embodiment of the present invention, an image signal for performing three-dimensional display is converted into an image signal corresponding to the display panel having twice as many scan lines, which makes it possible to reduce crosstalk.

A three-dimension image display system according to one embodiment of the present invention comprises liquid crystal shutter glasses having liquid crystal shutters which open or close based on the vertical synchronizing signal, and the display apparatus described above.

According to the embodiments of the present invention, a converting unit for converting an input image signal into an image signal corresponding to a display panel having twice as many scan lines is included in a signal driving unit. This makes it possible to perform image conversion without increasing the processing load on a timing controller and a scan driving unit.

The above and further objects and features will more fully be apparent from the following detailed description with accompanying drawings.

BRIEF DESCRIPTION OF THE DRAWINGS

FIG. 1 is a configuration diagram illustrating a configuration of a stereoscopic image viewing system including liquid crystal shutter glasses.

FIG. 2 is a block diagram illustrating a configuration of the main part of the stereoscopic image display apparatus.

DETAILED DESCRIPTION

Figure 3:
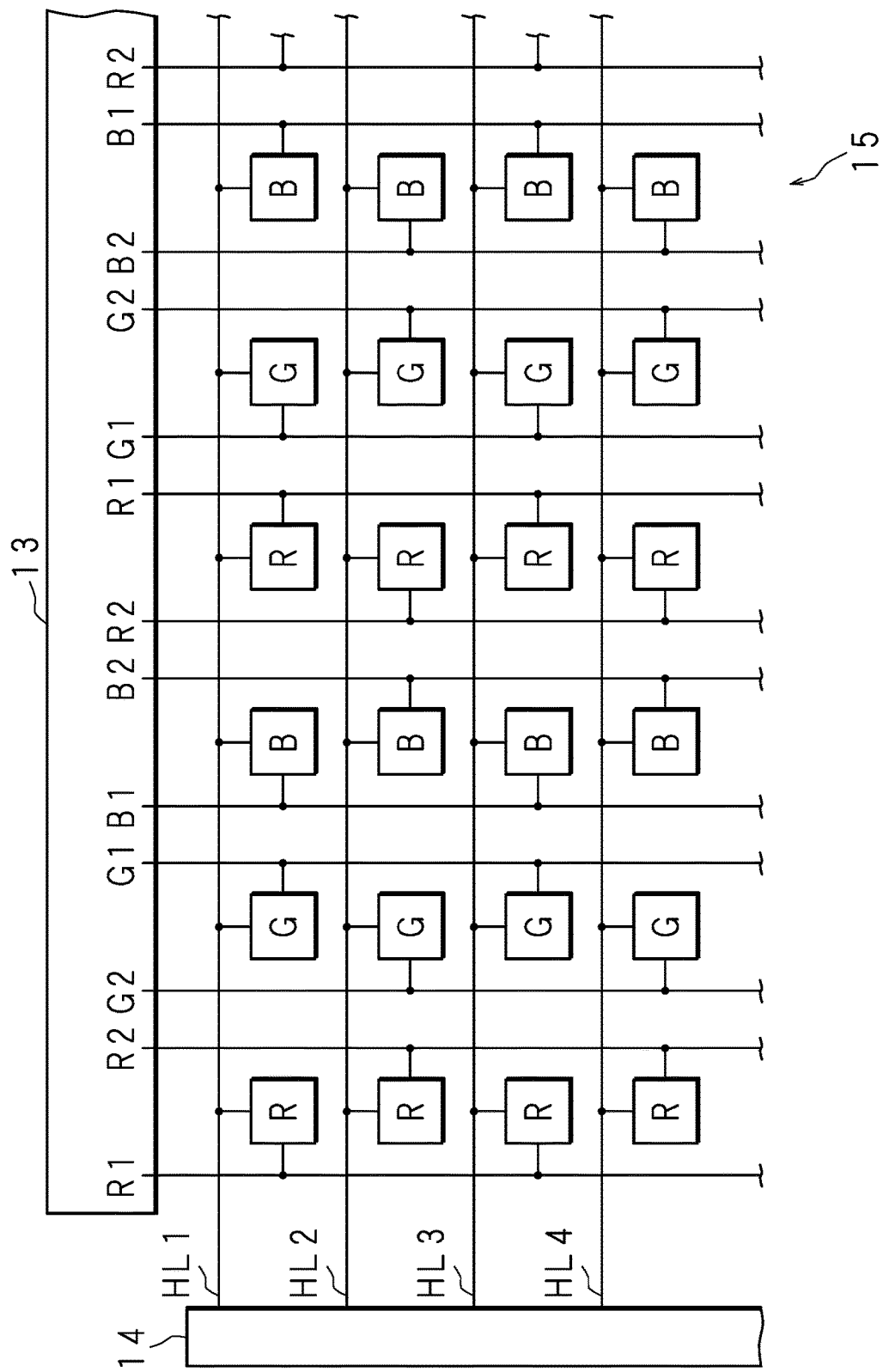
FIG. 3 is an illustrative view illustrating a part of a driving circuit of the liquid crystal panel.

Hereinafter, the present invention will be described in detail with reference to the accompanying drawings illustrating embodiments thereof. FIG. 1 is a configuration diagram illustrating a configuration of a stereoscopic image viewing system including liquid crystal shutter glasses. The stereoscopic image viewing system includes a stereoscopic image display apparatus (display apparatus) 1 and liquid crystal shutter glasses 2. The stereoscopic image display apparatus 1 alternately displays a left-eye image and a right-eye image at predetermined intervals. The stereoscopic image display apparatus 1 sends a control signal relating to the timing of switching between the left-eye image and the right-eye image to the liquid crystal shutter glasses 2. In response to the received control signal, the liquid crystal shutter glasses 2 control the opening and closing of each of the liquid crystal shutters for the right eye and the left eye. Thus, a user wearing the liquid crystal shutter glasses 2 can view a right-eye image only with the right eye and a left-eye image only with the left eye, and can stereoscopically view the image displayed on the stereoscopic image display apparatus 1.

FIG. 2 is a block diagram illustrating a configuration of the main part of the stereoscopic image display apparatus 1. The stereoscopic image display apparatus 1 includes a frame rate control circuit 11, a timing controller 12, a source driver (signal driving unit) 13, a gate driver (scan driving unit) 14, a liquid crystal panel (display panel) 15, and a shutter control signal generating unit 16.

The frame rate control circuit 11 generates a video signal having a frame rate higher than that of an input image signal. For example, a video signal of a frame rate of 60 fps (frames per second) is input and a video signal of 120 fps is output.

The timing controller 12 controls the source driver 13, the gate driver 14, and the shutter control signal generating unit 16. The timing controller 12 generates a display signal based on the image signal input by the frame rate control circuit 11, and outputs the display signal to the source driver 13. The timing controller 12 also generates a gate signal based on the image signal, and outputs the gate signal to the gate driver 14. In the case of three-dimensional display, the timing controller 12 generates a scanning signal having a frame rate twice as high as that of the input image signal. In the case of the three-dimensional display, since the liquid crystal panel 15 alternately displays the right-eye image and the left-eye image, there is a need to double the frame rate in order to maintain the frame rate of the liquid crystal panel as a whole.

FIG. 3 is an illustrative view illustrating a part of a driving circuit of the liquid crystal panel 15. Each pixel of the gate bus lines HL1, HL2, HL3, HL4 . . . is composed of sub-pixels of R, G and B.

The gate driver 14 sequentially applies voltage to the respective gate bus lines HL1, HL2, HL3, HL4 . . . . When voltage is applied to a gate bus line, a TFT (not illustrated) the gate of which is connected to the gate bus line is turned on.

An image signal of each of R, G and B for each of the gate bus lines HL1, HL2, HL3, HL4 . . . corresponding to the horizontal synchronizing signal is input to the source driver 13 from the timing controller 12. The source driver 13 applies signal voltage based on the image signal to each of the source bus lines for R1, G1, and B1 corresponding to the gate bus lines HL1, HL3 . . . . Similarly, the source driver 13 applies signal voltage based on the image signal to the source bus lines for R2, G2, and B2 corresponding to the gate bus lines HL2, HL4 . . . . Such a structure in which two source bus lines are provided for each of R, G and B is called a "double source structure."

In the case where a three-dimensional image is displayed on the liquid crystal panel 15, the timing controller 12 outputs, to the shutter control signal generating unit 16, an identification signal to identify whether the image displayed on the liquid crystal panel 15 is the right-eye image or the left-eye image. For example, the identification signal may be a binary signal having High and Low levels. It is in the High level when the right-eye image is displayed, and it is in the Low level when the left-eye image is displayed. The shutter control signal generating unit 16 generates a shutter control signal for controlling the liquid crystal shutters of the liquid crystal shutter glasses 2 based on the identification signal output from the timing controller 12, and sends the shutter control signal to the liquid crystal shutter glasses 2.

Figure 4:
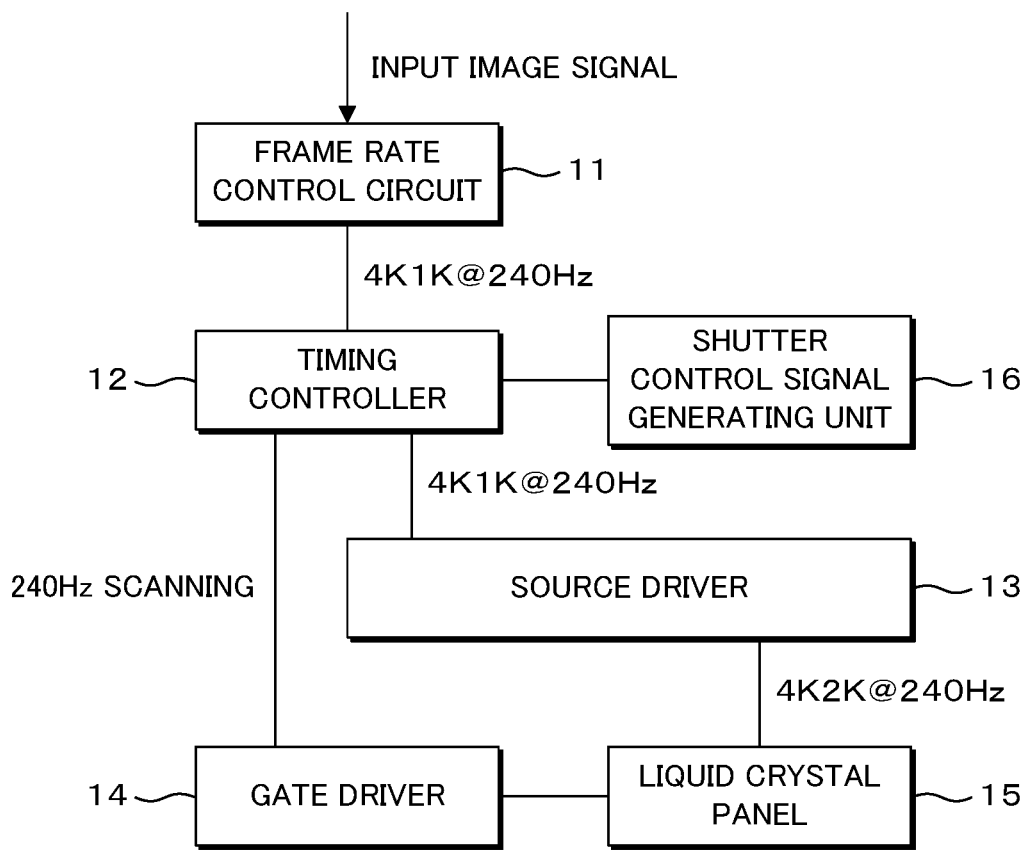
FIG. 4 is an illustrative view illustrating a flow of the image processing.

Next, image display processing of the stereoscopic image display apparatus 1 will be described. FIG. 4 is an illustrative view illustrating a flow of the image processing. An input image signal is input to the frame rate control circuit 11. The frame rate control circuit 11 generates an image signal of 4K1K (4096×1080 pixels) with an operating frequency of 240 Hz from the input image signal, and outputs the generated image signal to the timing controller 12. Hereinafter, the image signal having the number of pixels of 4K1K and an operating frequency of 240 Hz is referred to as 4K1K@240 Hz. The timing controller 12 controls the gate driver 14 such that the gate driver 14 operates at the scanning frequency of 240 Hz. The image signal output from the timing controller 12 is digitally copied (duplicated) in the source driver 13 to generate an image signal of 4K2K@240 Hz. More specifically, each data of a horizontal one line corresponding to one scan line is copied, and the copied data is inserted into the line next to the copied line, whereby the number of pixels in the vertical direction is converted from 1K to 2K.

Figure 5:
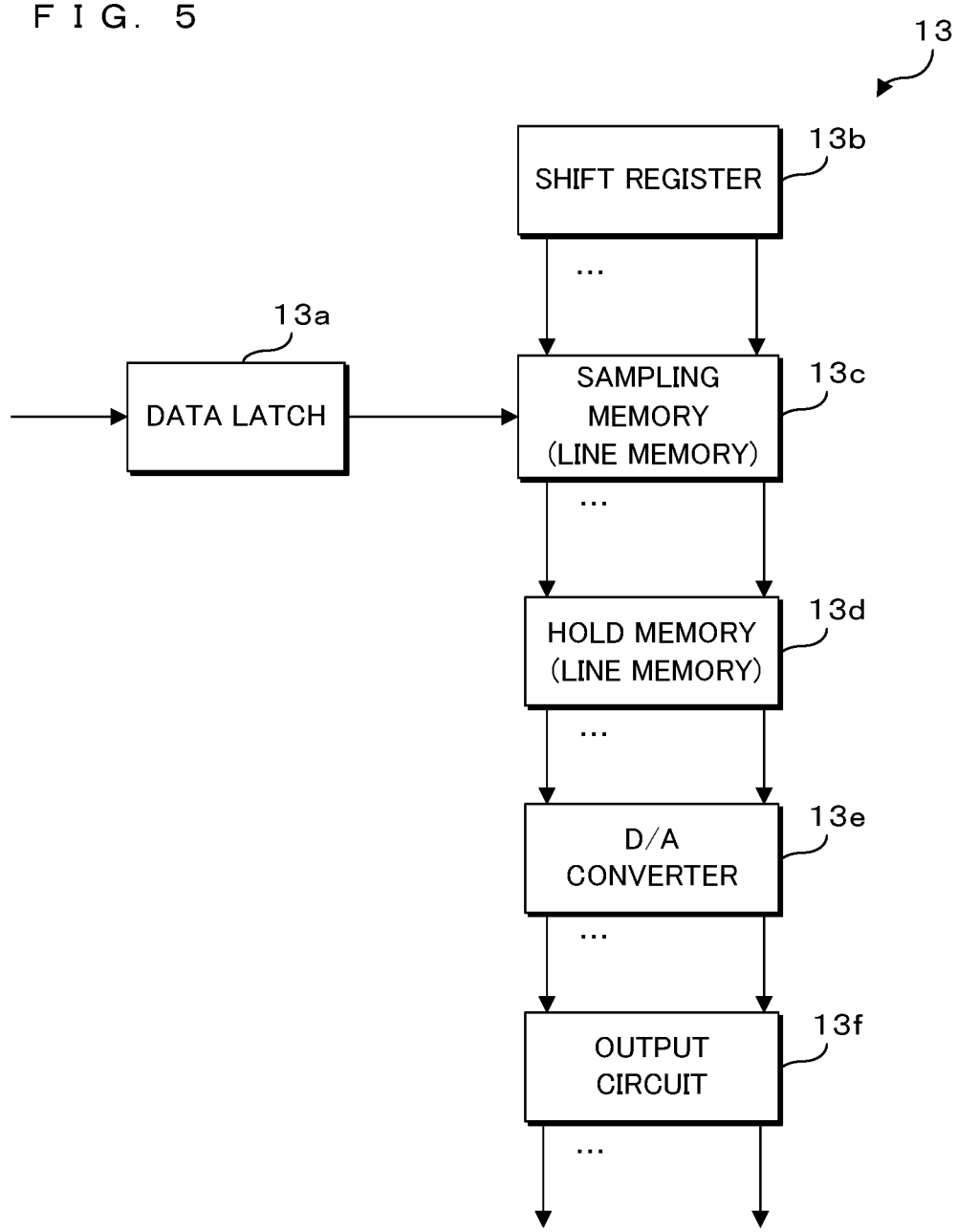
FIG. 5 is an illustrative view conceptually illustrating the configuration of the source driver.

FIG. 5 is an illustrative view conceptually illustrating the configuration of the source driver 13. The source driver 13 includes a data latch 13a, a shift register 13b, a sampling memory (line memory) 13c, a hold memory (line memory) 13d, a D/A converter 13e, and an output circuit 13f. The data latch 13a latches an image signal input to the source driver 13. The shift register 13b controls the timing of the sampling memory 13c. The sampling memory 13c sequentially stores the image signals input by the data latch 13a on one line basis. The hold memory 13*d* stores and holds the image signal of the voltage to be output. The D/A converter 13*e* converts the image signal to a voltage. The output circuit 13*f* outputs the voltage. The components 13*b*-13*f* are configured in an array by the number of outputs of the source driver 13. In general source drivers, every time one pixel of data is latched by the data latch, the data is stored in an area of one pixel in the sampling memory. On the other hand, in the case where digital copying is performed as describe above, every time one pixel of data is latched by the data latch 13*a*, the data is simultaneously stored in areas of two pixels in the sampling memory 13*c*. This makes it possible to convert the image signal of 4K1K into the image signal of 4K2K.

The timing controller 12 displays an image on the liquid crystal panel 15 based on the converted image signal. The displayed image is substantially an image of 4K1K@240 Hz.

As described above, in the stereoscopic image display apparatus 1 of the present embodiment, the image signal of 4K2K having an operating frequency of 240 Hz is generated by digitally copying the image signal of 4K1K having an operating frequency of 240 Hz in the source driver 13. Thus, the processing load on the source driver 13 is merely increased by the amount of copying processing while the processing load on the timing controller 12 maintains unchanged.

In the above-described example, 4K1K is converted into 4K2K. By applying a similar method, 8K2K (7680×2160 pixels) can be converted into 8K4K (7680×4320 pixels). Three-dimensional display with reduced crosstalk may be possible also on the 8K4K by merely adding the processing of the timing controller 12.

It is noted that partial signals are simply copied in the above-described example, but the method is not limited thereto. Signals interpolating before and after the partial signal to be processed may be generated and stored in the line memory 13*c*.

It is to be noted that, as used herein and in the appended claims, the singular forms "a", "an", and "the" include plural referents unless the context clearly dictates otherwise.

The technical features (components) described in each example embodiment may be combined with one another, and such combinations may form new technical features.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

The invention claimed is:

1. A display apparatus, comprising:
a timing controller extracting a vertical synchronizing signal and a horizontal synchronizing signal from an input image signal;
a display panel provided with a plurality of scan lines and a plurality of signal lines perpendicularly crossing the plurality of scan lines, and performing a display, in a case where a scanning voltage is applied to a scan line, in accordance with a signal voltage applied to a signal line based on an image signal;
a scan driving unit sequentially applying a scanning voltage to each of the scan lines in accordance with the extracted vertical synchronizing signal and horizontal synchronizing signal; and
a signal driving unit for applying a signal voltage to each of the signal lines,
wherein
the timing controller operates the scan driving unit at a predetermined frame rate,
the timing controller outputs an image signal which is based on the input image signal and whose vertical resolution is half of the vertical resolution of the display panel and whose horizontal resolution matches the horizontal resolution of the display panel to the signal driving unit, and
the signal driving unit comprises:
a data latch for latching the image signal received from the timing controller; and
a line memory for duplicating pixel data of the image signal received from the data latch,
wherein
each pixel of data of the image signal received from the data latch is duplicated by storing each pixel of data of the image signal received from the data latch in areas of two pixels of the line memory,
the duplication of the pixel data results in the vertical resolution of the image signal received from the timing controller being doubled, and
the signal driving unit applies the signal voltage to each of the signal lines in accordance with the image signal which is stored in the line memory, and of which the vertical resolution is twice the vertical resolution of the image signal received from the timing controller.

2. The display apparatus according to claim 1, wherein the image signal includes an image signal related to a right-eye-image and an image signal related to a left-eye-image for three-dimensional display, and
the timing controller generates a vertical synchronizing signal and a horizontal synchronizing signal such that a right-eye image and a left-eye image are alternately displayed on the display panel.

3. A three-dimensional image display system, comprising:
liquid crystal shutter glasses having liquid crystal shutters which open or close based on the vertical synchronizing signal, and
the display apparatus according to claim 2,
wherein the predetermined frame rate is set such as to reduce the occurrence of a phenomenon which the right-eye-image comes into the left-eye view when the liquid crystal shutter on the left eye side is open, or a phenomenon which the left-eye-image comes into the right-eye view when the liquid crystal shutter on the right eye side is open.

4. The display apparatus according to claim 1, further comprising:
a frame rate control unit for converting the frame rate of the input image signal to the predetermined frame rate higher than the frame rate.

* * * * *